United States Patent [19]

Wevelsiep et al.

[11] 4,424,587

[45] Jan. 3, 1984

[54] METHOD AND APPARATUS FOR THE IDENTIFICATION OF ARTICLES

[75] Inventors: Klaus Wevelsiep, Kriftel; Bernhard Sturm, Schmitten; Hans Scholze, Dreieich, all of Fed. Rep. of Germany

[73] Assignee: Scantron GmbH & Co. Elektronische Lesegerate KG, Frankfurt-Hoechst, Fed. Rep. of Germany

[21] Appl. No.: 253,475

[22] Filed: Apr. 13, 1981

[30] Foreign Application Priority Data

Apr. 16, 1980 [DE] Fed. Rep. of Germany ....... 3014513

[51] Int. Cl.³ ............................................. G06K 9/32
[52] U.S. Cl. ..................................... 382/44; 235/454; 382/46; 382/61
[58] Field of Search ............ 340/146.3 SG, 146.3 SY, 340/146.3 MA, 146.3 AC, 146.3 AE; 235/454, 462; 382/44–46, 48, 61

[56] References Cited

U.S. PATENT DOCUMENTS

| | | | |
|---|---|---|---|
| 3,553,437 | 1/1971 | Boothroyd | 382/61 |
| 3,603,728 | 9/1971 | Arimura | 382/61 |
| 3,701,098 | 10/1972 | Acker | 340/146.3 Z |
| 3,766,520 | 10/1973 | Patterson | 340/146.3 AE |
| 3,847,346 | 11/1974 | Dolch | 382/46 |
| 3,852,573 | 12/1974 | Dolch | 382/46 |
| 3,925,760 | 12/1975 | Mason et al. | 340/146.3 AE |

*Primary Examiner*—Leo H. Boudreau
*Attorney, Agent, or Firm*—Townsend and Townsend

[57] ABSTRACT

The invention relates to a method and apparatus for identifying objects (e.g. consumer products in a supermarket) appearing in random positions and orientations and for random times on an image window and having an identification on the surface facing the image window in the form of a data field having contrasting indicia in at least one data track. The data field is first scanned with a scanning raster until a product identification code is recognized denoting the position and orientation of the data track. The data track is then read with a closely-spaced reading raster and converted to a videosignal. The amplitude of the videosignal is coded into binary digits at discrete time points and the digits are stored in a memory matrix organized into columns and rows in such a manner that an image of the data track is stored in the memory. Mutually overlapping partial regions of the memory are then read out in a pre-arranged sequence and fed to a decoder capable of accepting and decoding the information in this form. In this way, the information is converted from a row-by-row sequence produced by the reading raster into a succession of digits corresponding to individual partial regions of the data track for the recognition of individual symbols appearing therein.

12 Claims, 5 Drawing Figures

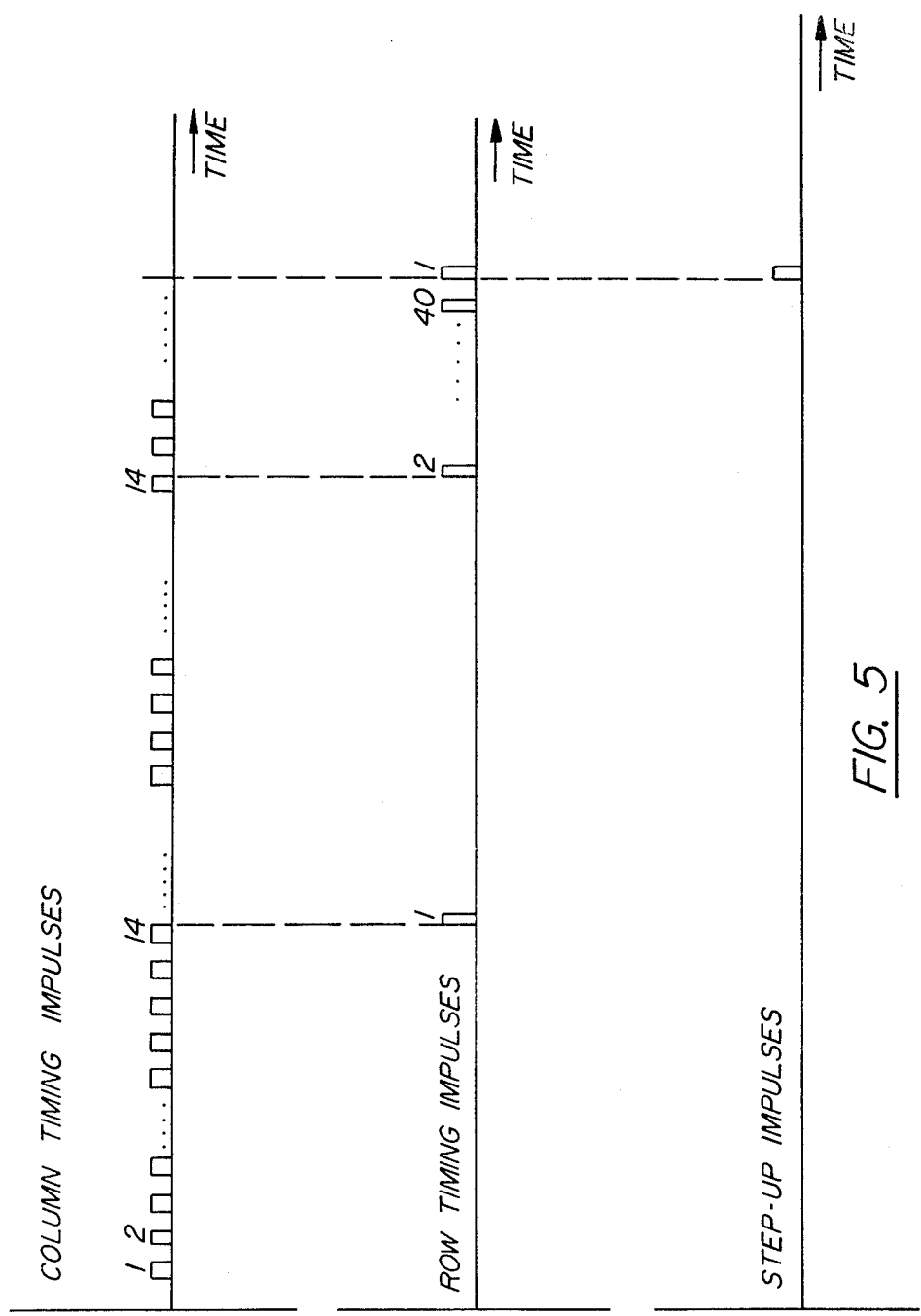

METHOD AND APPARATUS FOR THE IDENTIFICATION OF ARTICLES

The invention relates to a method for identifying objects appearing in random positions and orientations and for random times on an image window and having an identification on the surface facing the image window in the form of a data field which comprises contrasting indicia on at least one data track and having at least one contrasting line pattern (PIC) identifying the position and the orientation of the data track and contain a plurality of lines with varying spacing and/or line widths.

In such a method, the image window is scanned row-by-row with an opto-electronic scanner and a videosignal is produced which corresponds to the scanned contrasting sequence. In a first method step, the search operation, the image window is scanned with a search raster until the contrasting line pattern(s) is (are) cut by a plurality of raster rows and recognized. In a second method step, the angle between the data track(s) and the raster rows of the search raster is determined, and in a third method step, the reading operation, the data field is scanned in the same direction or at right angles to the data track(s) with a reading raster, and the indicia contained in the data track(s) is read and delivered as a video signal to a decoder for the decoding thereof.

The invention also relates to apparatus for carrying out this method.

Such a method and apparatus are known from DE-OS No. 23 38 561. It is essential in this known method that the indicia to be read be made available as video signals corresponding to the row-by-row scanning of the whole of the data field, by means of which video signals corresponding to complete rows respectively follow each other. To make possible decoding of video signals in this form in the simplest possible way, a special code was developed according to DE-OS No. 23 38 561 especially for this purpose, in which the individual indicia—essentially figures—are recognized by the position of marks (bars) extending at right angles to the scanning direction. The distribution of these marks in the upper and lower halves of a symbol format determines at any time the meaning of a figure represented in this way. This specially developed code is unwieldy, relatively difficult to read and not compatible with the coded symbols known and standardized today.

Another system for omnidirectional reading of plain symbols is known, in which a diode matrix is located in the tip of a reading gun, the size of which overlaps the edges the sides of the symbol formats of conventional plain codes of OCR-A or OCR-B symbols. The diode matrix is moved by hand over the data track, which contains the OCR-A symbols necessary for price or product identification, in order to carry out a reading operation. While the data track is passed over by hand, the diode matrix is sensed by a relatively high frequency point-to-point and row-by-row reading scan. A video signal is thereby produced which contains, in time sequence, the light/dark information of the contrasting line pattern of the scanned rows of the diode matrix. As each new sensing of the diode matrix takes place, the diode matrix is located—in view of the movement of the reading gun—over a different partial region of the data track, which is then read by the reading scan. Because of the relatively high frequency of the reading scan, the successively scanned partial regions overlap each other and are submitted in such a sequence to the decoder, which decodes the video signal obtained in this manner and produces a reference signal—in one of the known standard codes—corresponding to the symbols thus read.

Because of the completely different reading techniques involved in the automatic omnidirectional reading method according to DE-OS No. 23 38 561 and in the hand-held gun reading method, it was not possible until now to combine the development and use of the gun reading system already proved in practice and the automatic omnidirectional reading system. In particular, it was not possible until now to decode OCR-codes according to the method of DE-OS No. 23 38 561, since there is no decoder that can decode the video signals thus obtained.

The object of the invention is therefore to produce a method and apparatus of the above described type, that can read standardized OCR-A or OCR-B symbols in a simple manner making use of known assemblies.

This object is solved according to the invention by a method of the above-mentioned type in which (a) the amplitude of the video signal is coded at successive discrete time points into binary digits which characterize the light/dark values of the corresponding raster points $(x_p, y_p)$ of the data field, (b) the digits are entered serially and in a sequence of rows into a memory matrix, whereby successive memory positions of a memory matrix row correspond to equivalent successive raster points of a respective scanning row of the data field, (c) and then mutually overlapping partial regions of the memory matrix, whose size corresponds to the format of a symbol, are sequentially read out at a predetermined reading pulse and are decoded.

The object is further solved by means of an apparatus which serves to carry out the method according to the invention. In such an apparatus, the image window is formed on the target of an opto-electronic scanner, which is scanned by a deflection system in a row-by-row raster and delivers at its output an electrical video signal which duplicates the contrasting pattern of the scanned rows as a corresponding amplitude sequence. The apparatus further comprises a PIC-decoder for the recognition of the scanned contrasting line pattern (PIC), which defines the position and orientation of the data track(s) of the data field. The deflection system comprises a first deflection generator for the periodic output of a row deflection signal (deflection in the x-direction), and a second deflection generator for the output of a row step-up signal (deflection in the y-direction). This apparatus is characterized according to the invention in that (a) a video signal raster coding circuit is provided which codes the amplitude of the video signals at successive discrete time points into binary digits which characterize the light/dark values of the corresponding raster points of the data field, (b) a memory is provided having a matrix arranged in rows and columns and a read-in address control by which the binary digits can be entered serially and organized into rows, whereby the occupied memory positions in a matrix row correspond to the equivalent raster points of the respective raster row of the data field, (c) a read-out address control is provided, which subsequently addresses and reads-out mutually overlapping partial regions of the memory matrix, corresponding in size to a symbol format, with a predetermined reading pulse, and supplies the information to a suitable decoder of the already-existing type.

The advantage of the invention consists in particular in that the data field is split up into a scanning row and column raster, that the individual raster points correspond to binary digits which define the light/dark values of successive raster points x, y, that the digits assigned to the raster points x, y are entered and stored in a matrix organized into rows and columns, so that the optical light/dark pattern of the data field is duplicated in the form of binary coded digits in the memory matrix. Then mutually overlapping partial regions of the memory matrix are sequentially read out and decoded with a predetermined reading pulse. The size of the partial region corresponds to the format of a symbol. The information in the form read out from the memory is decodable with higher redundancy by an OCR-decoder. In particular, the information according to the invention is so prepared that it can easily be decoded by the OCR-decoder of the gun reading system. Therefore, according to the invention, the automatic omnidirectional reading method becomes compatible with the omnidirectional gun reading system available on the market.

To achieve complete compatibility with the decoder of a gun reading system, it is preferred that the memory positions of the addressed partial regions of the memory matrix be read out as a sequence of points and rows, i.e. the memory positions of the first row, and the second row, etc. are read out one after the other and delivered to the decoder as a series of video signals. The reading pulse, and—as the number of rows and columns of the partial region is determined by the decoder employed—also the row pulse and the column pulse are provided by the decoder or a separate read-out pulse control.

The symbols of the data field which are next to each other in the data track are stored next to each other in the memory matrix in the row or column direction. It is therefore preferred to mask regions of the data field that do not contain printed information so that only the binary digits corresponding to the raster points of the printed symbol field are stored in the memory matrix. The partial regions of the memory matrix are read out in such a manner as to advance from symbol to symbol in the row or column direction and fed to the decoder. Successive partial regions of the memory matrix to be read are preferably displaced from each other in any particular case by one matrix column or row—i.e. by one memory position in the row or column direction.

By the method according to the invention the optical data field to be read is thus, as it were, duplicated in the memory. Then, by the read-out step according to the invention, the information is presented to an OCR-decoder of the known hand-held gun reading system in a form in which the decoder would otherwise receive it from the hand moved reading scanned diode matrix of the special reading gun. Thus, according to the invention, the special information processing of the hand-held gun reading system is simulated by the intermediate storing and subsequent reading steps.

Advantageous further developments of the invention are characterized by the features of the claims below.

An embodiment of the invention is explained in more detail in the following with reference to the drawings, in which:

FIG. 5 shows the read-out synchronizing impulse necessary for read-out of the memory matrix.

Figure 1:
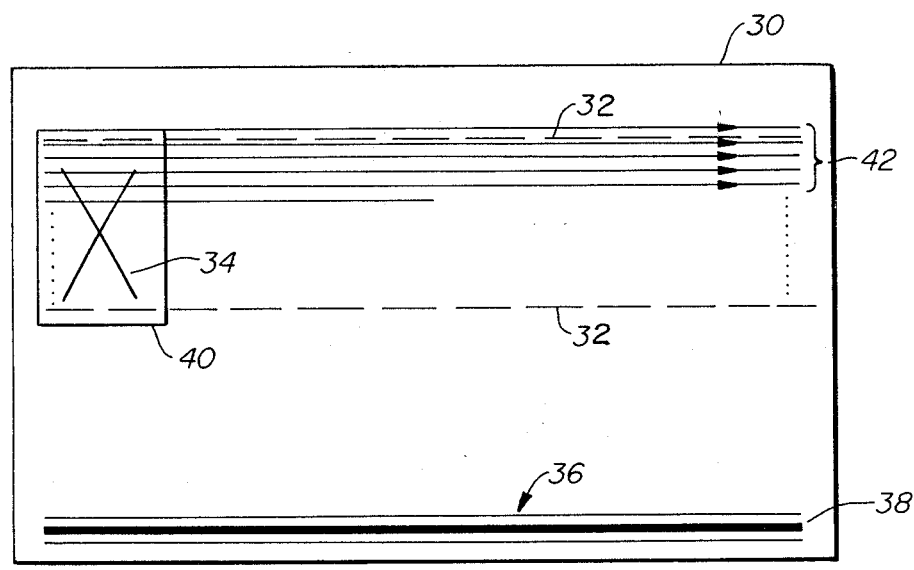
FIG. 1 shows a data field to be read which appears e.g. as a price ticket on the image window.

FIG. 1 shows an example of a data field to be read that, for example, consists of a price ticket 30 which contains, in one or two data tracks 32, a plurality of optically contrasting symbols 34 of a standard code in clear e.g. the OCR-A code or the OCR-B code. A contrasting line pattern or PIC-pattern 36 extends parallel to and below the data track 32 and which defines the position and the orientation of the data track 32 and contains a plurality of parallel lines 38 having varying spacings and/or line widths. The size of the symbol format 40, which is a function of the size of the symbol 34 or is standardized, is shown around the symbol 34. Also shown is a succession of rows 42 by which the reading raster scans the ticket 30.

In the first method step, the image window is scanned with a relatively widely spaced search raster at various search angles, until a plurality of raster scans cut the PIC-pattern 38 and a recognition of the PIC-pattern is possible. In a second method step, the angle between these raster scanning rows and the PIC-pattern, i.e. also the direction of the data track 32, is determined. In a third method step, the data field 30 is scanned in the direction of the data track 32 with a closely spaced reading raster 42, the symbols 34 contained in the data track 32 are read row-by-row and delivered as a corresponding video signal to a decoder. The video signal has an amplitude sequence which corresponds to the scanned light/dark contrast sequence. The intervals corresponding to the scanned rows appear in series in the video signal.

Figure 2:
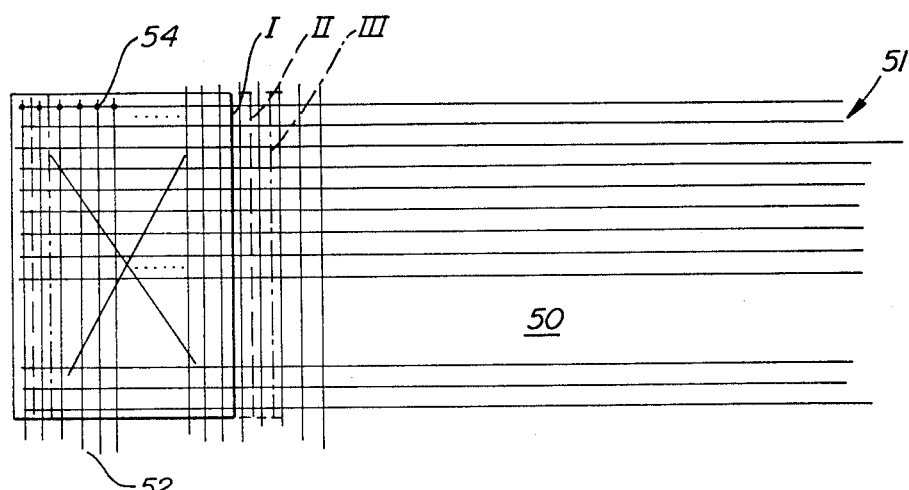
FIG. 2 shows a graphic representation of a part of the memory matrix, which is provided for the storage of symbols contained in a data track.

FIG. 2 shows a segment of the memory matrix of the memory 4, in which the information contained in the video signal is stored in the form of an image. The memory positions within the memory matrix 50 are located at the points of intersection of rows 51 and columns 52. The amplitude of the video signal is coded serially with a predetermined raster timer into binary digits at a succession of discrete time points. As each of these discrete raster time points correponds to a raster point within the data field, the binary digits consequently identify the light/dark values of the corresponding raster points of the data field 30. This data is entered in series and in a sequence of rows into the memory matrix 50. Therefore, the bits of information from the video signal following each other in time sequence for an interval corresponding to a row are entered, one after the other, into memory positions 54 of a memory matrix row 51, and the bits of information from the next-following interval of the video signal corresponding to a row are entered into the memory positions of a neighbouring memory matrix row. Consequently, so to say, an opto-electrical image of the row-by-row scanned data field is formed in a memory matrix organized into rows and columns.

Then, mutually overlapping partial regions I and II, III . . . of the memory matrix, the size of which corresponds to the format of a symbol, are sequentially read out and decoded in a predetermined reading pulse. As the scanned data track(s) is entered into the memory matrix 50 in such a way that the rows in the memory correspond to the scanning rows of the data track, so that neighbouring printed symbols in the data field are stored next to each other in the row direction, the partial regions I, II, III . . . of the memory matrix 50 are advanced from symbol to symbol in the direction of the rows and are read out overlapping each other. Successive partial regions I, II or respectively II, III etc. are displaced from each other in each case by a matrix column, or if necessary, however, by a fixed number of matrix columns. Consequently, the start addresses of the individual partial regions pass through the memory positions lying next to each other within a memory row in a predetermined reading pulse.

The memory positions within the individual partial regions I, II, III etc. are read out point-by-point and row-by-row, and the read direction runs in the same direction or opposite to that in which the start address runs through its row.

In a preferred embodiment of the invention the individual partial regions of the memory matrix have, for example, 38 rows and 14 columns. The memory region for individual symbols amounts to, for example, 19 rows and, for example, 8 or 9 columns. The read-out partial regions I, II etc. consequently overlap at their edges the corresponding symbol regions. The memory delivers at its data output a succession of binary digits read in succession from the first row, then the second row, then the third row, etc. These signals are fed to the decoder 16, which is a conventional OCR-decoder and is installed in the hand reading gun-system for OCR-A or OCR-B code.

Figure 3:
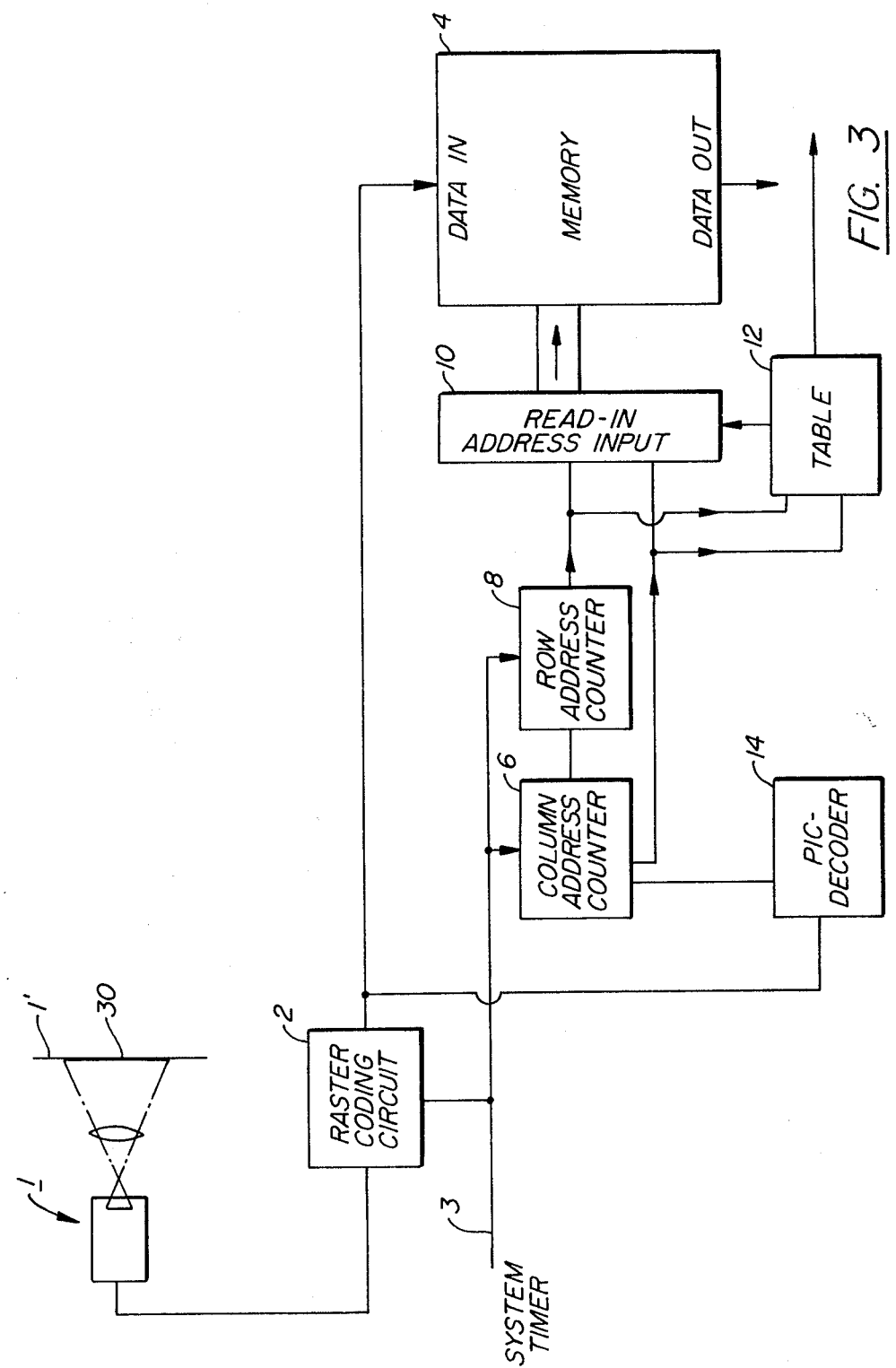
FIG. 3 shows the read-in part of the circuit according to the present invention.

FIG. 3 shows a block circuit diagram of the read-in part of the apparatus according to the invention. A data field 30, e.g. a price ticket, appears in the image window 1' of the apparatus in a random position and orientation and for a random time. By means of an opto-electrical deflection system, the data field 30 is formed on the target of the opto-electronic scanner 1. The target is scanned in a row-by-row raster by a deflection system 40 (not shown), see FIG. 1, and an electrical video signal is produced at the output of the opto-electronic scanner, which duplicates the contrasting pattern of the scanned sequence of rows as a corresponding amplitude sequence. The apparatus contains a PIC-decoder 14 for the recognition of the scanned PIC-pattern. The deflection system contains a first deflection generator (not shown) for the periodic output of a row deflection signal (deflection in the x-direction), and a second deflection generator (not shown) for the output of a row step-up signal (deflection in the y-direction) at the end of each row deflection signal.

A raster coding circuit 2 is connected to the output of the opto-electronic deflector 1, which codes the amplitude of the videosignal into binary digits at a succession of discrete time points provided by the system timer 3, the binary information thus identifying the light/dark values of the corresponding raster points of the data field.

The output of the raster coding circuit 2 is connected to the data input of a memory 4 which contain the memory matrix 50 organized into rows and columns.

A read-in address control circuit 6 to 12 is also timed by the system timer 3, the control circuit being connected to the address input 10 of the memory 4 and conducts an addressing of the memory positions synchronously with the production of the bits of information. The read-in addressing control device contains a column address counter 6 and a row address counter 8. The column address counter 6 counts the impulses from the system timer, which are produced by any suitable pulse generator, and delivers the column address of the actual memory place to the address input 10 of the memory as a counter reading. The row address counter 8 produces a row step-up impulse after receiving a predetermined number of generated column address impulses from the column address counter 6, which increments the row address of the actual memory positions by the value 1. During the next interval corresponding to a row, the memory positions within the actual memory row 51 are occupied one after the other by time synchronized bits of information. The output of a row step-up impulse from the row address counter, and thereby the incrementation of the row address, takes place synchronously with the output of the row step-up impulse delivered by the deflection generator of the opto-electrical scanner 1 to the deflection system in order to begin the scanning of a new row of the data field. The divisions of the video signal produced at the output of the opto-electronic scanner corresponding to the scanned rows are consequently faithfully entered into the corresponding rows in the memory matrix.

The read-in address control device further contains an address selection circuit 12 in the form of a table, in which are stored the addresses of those raster points of the data field 30 which, according to the type of ticket 30, do not contain printed material. If the address of such a raster point is introduced into the table 12 from the column address counter 6 and the row address counter 8, the table 12 delivers an output signal to the address input 10 of the memory, which prevents the incrementation of the actual address. It is thereby assured that the positions within the memory matrix 50 are only occupied by coded bits from the region of the data field 30 on which information is printed.

The read-in address control device is only activated if the PIC-decoder 14 recognizes a PIC-pattern within a plurality of successive scanning lines and then delivers a PIC-recognition signal PIC-OUT to the column address counter 6.

Figure 4:
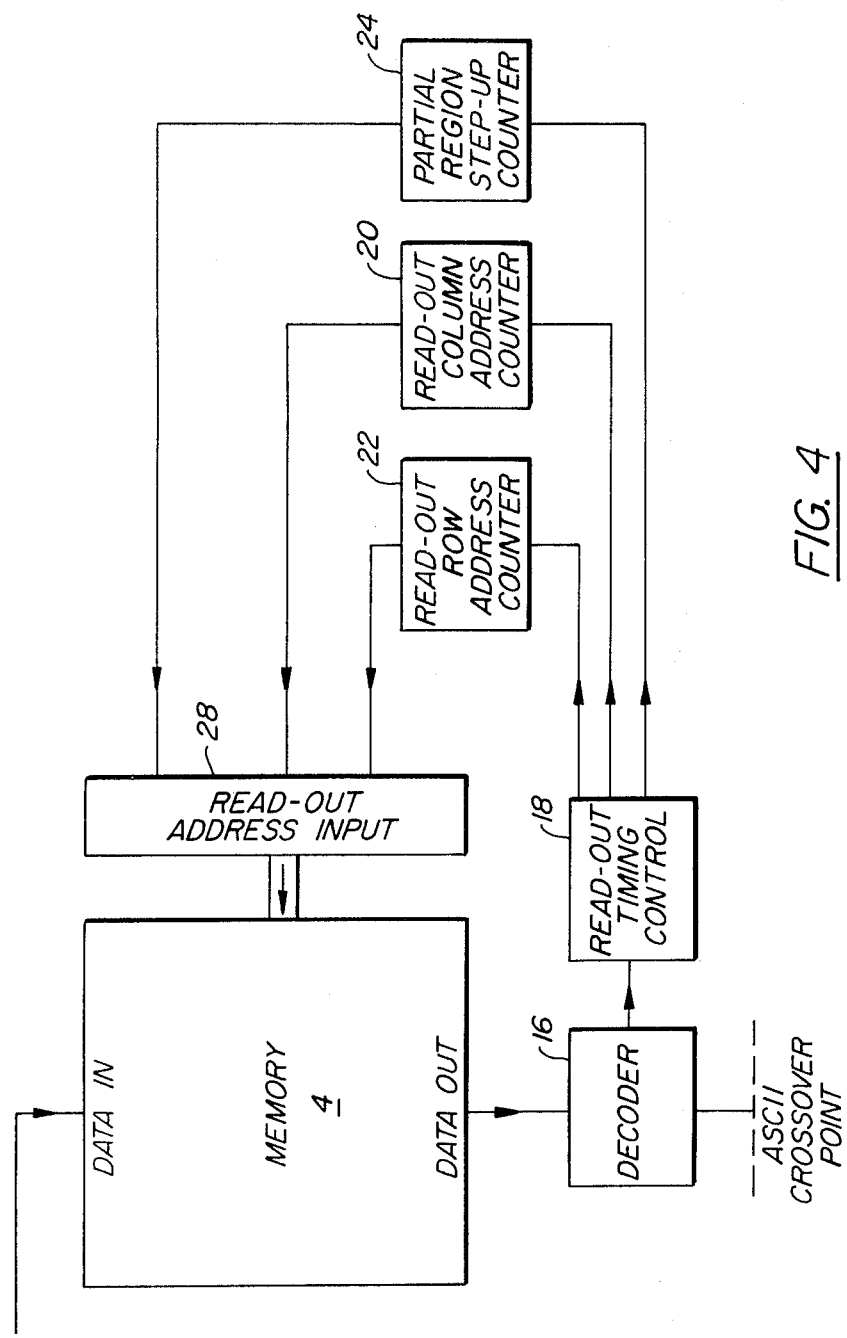
FIG. 4 shows the read-out part of the circuit according to the invention.

The read-out address control device, see FIG. 4, comprises a separate read-out timing control 18, which delivers column timing impulses to a read-out column address counter 20. The read-out timing control device 18 also delivers row timing impulses to a row address counter 22—and increments its counter reading in each case by the value 1—, when the column address counter 20 has delivered a predetermined number of column addresses to the read-out side address input 28. The number of column timing impulses delivered to an actual row address corresponds to the number of columns in a partial region to be read out. If the partial region of the memory matrix to be read out, which overlappingly covers the memory positions of a symbol, contains for example 14 columns and 38 rows, a row timing impulse is delivered after each 14 column timing impulses, and which increment the row address by the value 1. A start address step-up impulse is delivered from a partial region step-up counter 24 after all the rows of the partial region to be read out have been addressed, the partial region step-up counter 24 being synchronized with the row address counter 22, and thereby the start address for the next partial region to be read out, e.g. partial region II, is delivered to the address input 28. If the single partial regions I, II, III are to be read out in an overlapping fashion in the direction of the memory rows, the stepping-up of the start address of the partial region to be read out results at a constant row address, and only the column address is incremented in each case, e.g. by the value 1.

During the read-out addressing, the data output of the memory synchronously delivers the contents of the addressed memory places, i.e. the binary digits identifying the light/dark values of the raster points, to a decoder 16 which has at its output e.g. an ASCII-crossover point (American Standard Code for information interchange) and delivers correspondingly coded symbol signals. The decoder 16 may be a known OCR-decoder which is installed in a hand held gun reading system for the recognition of code in clear.

FIG. 5 shows the timing impulses generated by the read-out control device. In each case, a row impulse is generated after a certain number of column impulses, and a step-up impulse is delivered by the partial region step-up counter 24 after a predetermined number of row impulses—in the foregoing example after 40 row impulses—whose counter reading is correspondingly incremented and delivered to the read-out address input 28. An address-indexing system which operates in the reverse manner by reading out through a corresponding reverse transformation, clearly lies within the scope of the invention above. Furthermore, it is possible to scan the data field column-wise and to form an image in the memory in the desired way by using a corresponding address-indexing system during reading-in.

We claim:

1. In a method for the identification of articles which appear in random positions and orientation and at random times at an image window, said articles having an identification on a surface thereof facing the image window in the form of a data field, said data field comprising contrasting indicia in at least one data track and at least one contrasting line pattern (PIC), said PIC indicating the position and orientation of the data track and containing a plurality of lines with varying spacing and/or line widths, wherein the image window is scanned with an opto-electronic scanner in a sequence of rows to generate a corresponding video signal of the scanned contrasting sequence wherein in a first method step, a search operation, the image window is scanned with a search raster until the contrasting line pattern(s) is (are) cut by several raster scans and recognized, wherein in a second method step, the angle between the data track(s) and the scanning rows of the search raster is determined, and in a third method step, a reading operation, the data field is scanned with a reading raster in the direction of, or perpendicular to, the data track(s), and the symbols contained in the data track(s) are read and fed as said video signal to a decoder for decoding thereof, the improvement to the method comprising:
    (a) coding the amplitude of said video signal at successive discrete time points into binary digits which represent light/dark values of the corresponding raster points (x,y) of the data field,
    (b) entering the digits serially and in a sequence of rows into a memory matrix, whereby successive memory positions of a memory matrix row correspond to equivalent successive raster points of a scanning row of the data field,
    (c) and thereafter sequentially reading out and decoding at a predetermined reading rate mutually overlapping partial regions of the memory matrix, the size of said partial regions corresponding to the size of the format of a symbol and the displacement between successive partial regions being substantially smaller than the size of the partial regions.

2. A method according to claim 1, wherein the memory positions of the partial regions are read out in point and row sequences.

3. A method according to claim 1 wherein neighboring symbols in the data track(s) are stored in the memory matrix next to each other in the row or column direction, and wherein the partial regions of the memory matrix are read out in an overlapping manner from one symbol to the next in the respective row or column direction.

4. A method according to claim 3, wherein successive partial regions of the matrix are displaced from each other in each case by one column or row of the matrix.

5. In an apparatus for identifying articles which appear in random positions and orientation and at random times at an image window, said articles having an identification on a surface thereof facing the image window in the form of a data field, said data field comprising contrasting indicia in at least one data track and at least one contrasting line pattern (PIC), said PIC designating the position and orientation of the data track and containing a plurality of lines with varying spacing and/or line widths, wherein the image window is defined on the target of an opto-electrical scanner, said image window being scanned in a row-by-row raster by a deflection system to output a video signal which sequentially duplicates the contrasting pattern of the scanned rows as a corresponding amplitude sequence, wherein a PIC-decoder is provided for the recognition of the scanned contrasting line pattern (PIC), and wherein the deflection system contains a first deflection generator for the periodic output of a row deflection signal (deflection in the x-direction) and a second deflection generator for the output of a row step-up signal (deflection in the y-direction) at the end of each row deflection signal, the improvement to the apparatus comprising:
    (a) a video signal raster coding circuit which codes the amplitude of the video signals at successive discrete time points into binary digits which represent the light/dark values of the corresponding raster points of the data field and which is capable of distnguishing between successive partial regions wherein the displacement between successive partial regions is substantially smaller than the size of the partial regions,
    (b) a memory having a storage matrix arranged in rows and columns and a read-in address control which enters the data serially and organized in rows into the memory matrix, such that the occupied memory positions of a memory matrix row correspond to the equivalent raster points of the respective raster row of the data field, and
    (c) a read-out address control which subsequently addresses and reads out at a predetermined reading rate mutually overlapping partial regions of the memory matrix which correspond in size to a format of a symbol to supply the information to a suitable decoder.

6. Apparatus according to claim 5, wherein the read-in address control only becomes activated for the introduction of binary digits if a PIC-decoder generates a PIC-recognition symbol (PIC OUT) as a result of the presence of at lease one PIC-pattern in the video-signal.

7. In an apparatus for identifying articles which appear in random positions and orientation and at random times in an image window, said articles having an identification on a surface thereof facing the image window in the form of a data field, said data field comprising contrasting indicia in at least one data track and at least one contrasting line pattern (PIC), said PIC designating the position and orientation of the data track and containing a plurality of lines with varying spacing and/or line widths, wherein the image window is defined on the target of an opto-electrical scanner, said image window being scanned in a row-by-row raster by a deflection system to output an electrical video signal which sequentially duplicates the contrasting pattern of the scanned rows as a corresponding amplitude sequence, wherein a PIC-decoder is provided for the recognition of the scanned contrasting line pattern (PIC), and wherein the deflection system contains a first deflection generator for the periodic output of a row deflection signal (deflection in the x-direction) and a second deflection generator for the output of a row step-up signal (deflection in the y-direction) at the end of each row deflection signal, the improvement to the apparatus comprising:
 (a) a video signal raster coding circuit which codes the amplitude of the video signals at successive discrete time points into binary digits which represent the light/dark values of the corresponding raster points of the data field,
 (b) a memory having a storage matrix arranged in rows and columns and a read-in address control which enters the data serially and organized in rows into the memory matrix, such that the occupied memory positions of a memory matrix row correspond to the equivalent raster points of the respective raster row of the data field, and
 (c) a read-out address control which subsequently addresses and reads out a predetermined reading rate mutually overlapping partial regions of the memory matrix which correspond in size to a format of a symbol to supply the information to a suitable decoder wherein the raster coding circuit is timed by a system timer and the actual amplitude value of the video signal is coded into a binary digit at each transmission of a system timing impulse; wherein the read-in address control contains a column address counter and a row address counter; wherein the column address counter counts system timing impulses and transmits the column address of the actual memory place as a counter reading; wherein the row address counter counts row step-up impulses from the column address counter and transmits the row address of the actual memory place, such that the row step-up impulse is transmitted each time the column address counter reaches a predetermined counter reading corresponding to the number of columns of the memory matrix; and wherein during the delivery of the column address and the row addresses to the address input of the memory, the binary digits from the raster coding circuit are supplied synchronously to the data input of the memory for storage in the addressed memory positions.

8. Apparatus according to claim 5, 7 or 6 wherein an address selection circuit is provided before the address input of the memory, the address selection circuit being operative to interrupt the read-in process upon the appearance of certain addresses transmitted from the address counters.

9. In an apparatus for identifying articles which appear in random positions and orientation and at random times in an image window, said articles having an identification on a surface thereof facing the image window in the form of a data field, said data field comprising contrasting indicia in at least one data track and at least one contrasting line pattern (PIC), said PIC designating the position and orientation of the data track and containing a plurality of lines with varying spacing and/or line widths, wherein the image window is defined on the target of an opto-electrical scanner, said image window being scanned in a row-by-row raster by a deflection system to output an electrical video signal which sequentially duplicates the contrasting pattern of the scanned rows as a corresponding amplitude sequence, wherein a PIC-decoder is provided for the recognition of the scanned contrasting line pattern (PIC), and wherein the deflection system contains a first deflection generator for the periodic output of a row deflection signal (deflection in the x-direction) and a second deflection generator for the output of a row step-up signal (deflection in the y-direction) at the end of each row deflection signal, the improvement to the apparatus comprising:
 (a) a video signal raster coding circuit which codes the amplitude of the video signals at successive discrete time points into binary digits which represent the light/dark values of the corresponding raster points of the data field,
 (b) a memory having a storage matrix arranged in rows and columns and a read-in address control which enters the data serially and organized in rows into the memory matrix, such that the occupied memory positions of a memory matrix row correspond to the equivalent raster points of the respective raster row of the data field, and
 (c) a read-out address control which subsequently addresses and reads out at a predetermined reading rate mutually overlapping partial regions of the memory matrix which correspond in size to a format of a symbol to supply the information to a suitable decoder, wherein an address selection circuit is provided before the address input of the memory, the address selection circuit being operative to interrupt the read-in process upon the appearance of certain addresses transmitted from the address counters.

10. In an apparatus for identifying articles which appear in random positions and orientation and at random times in an image window, said articles having an identification on a surface thereof facing the image window in the form of a data field, said data field comprising contrasting indicia in at least one data track and at least one contrasting line pattern (PIC), said PIC designating the position and orientation of the data track and containing a plurality of lines with varying spacing and/or line widths, wherein the image window is defined on the target of an opto-electrical scanner, said image window being scanned in a row-by-row raster by a deflection system to output an electrical video signal which sequentially duplicates the contrasting pattern of the scanned rows as a corresponding amplitude sequence, wherein a PIC-decoder is provided for the recognition of the scanned contrasting line pattern (PIC), and wherein the deflection system contains a first deflection generator for the periodic output of a row deflection signal (deflection in the x-direction) and a second deflection generator for the output of a row step-up signal (deflection in the y-direction) at the end of each row deflection signal, the improvement to the apparatus comprising:
  (a) a video signal raster coding circuit which codes the amplitude of the video signals at successive discrete time points into binary digits which represent the light/dark values of the corresponding raster points of the data field,
  (b) a memory having a storage matrix arranged in rows and columns and a read-in address control means which enters the data serially and organized in rows into the memory matrix, such that the occupied memory positions of a memory matrix row correspond to the equivalent raster points of the respective raster row of the data field, and
  (c) a read-out address control which subsequently addresses and reads out a predetermined reading rate mutually overlapping partial regions of the memory matrix which correspond in size to a format of a symbol to supply the information to a suitable decoder wherein the read-out address control comprises a read-out timing control for the delivery of a column pulse to a read-out column address counter and for the delivery of a row pulse to a read-out row address counter, such that a read-out row timing impulse is operative to increment the row address counter when the column address counter has addressed all the rows in the partial region of the memory matrix to be read out, and wherein a start address step-up counter is provided which is operative to increment the start address of the partial region of the memory matrix to be read out after a corresponding predetermined number of read-out row timing impulses have been received from the row address counter and all the rows within the partial region of the memory matrix to be read out have been addressed.

11. Apparatus according to claim 10, wherein the first start address which the step-up counter delivers is programmed into the step-up counter by the read-in address counters.

12. Apparatus according to claim 10 or claim 11, wherein in the case of the incrementing of the start address of the partial region of the memory matrix to be read out which takes place at a constant row address, the row address is incremented by only one row in each case.

* * * * *